3,000,698
PRECIPITATION OF DENSE AMMONIUM DIURANATE

Gordon A. Crowe, Kansas City, Mo., assignor to Spencer Chemical Company, Kansas City, Mo., a corporation of Missouri
No Drawing. Filed Mar. 12, 1959, Ser. No. 798,859
10 Claims. (Cl. 23—14.5)

This invention relates to the precipitation and recovery of chemical materials. More particularly, it is concerned with a process of producing precipitates that are dense, settle quickly, and have good filtering characteristics.

It is known that various substances are soluble in liquids, such as water, at certain pH values, either acidic or basic, and that such materials often are insoluble, or of reduced solubility, in the same liquid at a different pH value. This property is widely used to recover various materials from solution since, after the precipitate is formed, it can be separated from the liquid medium by filtration or decantation. However, many of the materials so precipitated are light, very fine particle sized solids which settle slowly and are only filterable slowly and with difficulty because they clog the filter.

It has now been discovered that materials which are precipitatable from solution by change in pH can be precipitated in a state which settles quickly and is readily filterable. This is accomplished by reciprocating or oscillating the pH of a solution of a material from a pH at which the material is substantially insoluble in the liquid to a pH at which the material is of greater solubility in the liquid, but without dissolving all of the precipitate, and then bringing the mixture back to a pH at which the material is substantially insoluble. The precipitate then may be recovered readily by decantation or filtration, or the pH oscillation procedure repeated as desired or advisable to further improve the characteristics of the precipitate.

Although the invention has wide applicability, it is especially useful in the atomic energy field for the preparation and separation of ammonium diuranate, which is an important intermediate in the production of uranium oxide for atomic reactors.

Ammonium diuranate is conventionally prepared by treating an aqueous solution of a water-soluble uranium salt, such as the sulfate or nitrate, with ammonium hydroxide to form a precipitate of ammonium diuranate which is then filtered. The subsequent filtration is slow and troublesome due to the lack of permeability in the filter cake.

By use of the reciprocating pH process, however, ammonium diuranate is obtained in a state which settles rapidly to a sludge of less volume and which is more easily filtered than is the precipitate formed in the conventional way.

In applying the invention to the recovery of ammonium diuranate, an aqueous solution of uranium sulfate or nitrate at a pH of less than, or below, 4.5 is treated with ammonium hydroxide or ammonia gas until the pH goes above pH 6 after which the pH is brought below 4.5 by the addition of acid, and then above pH 6 by the addition of ammonium hydroxide or ammonia. It should be understood, however, that the pH values at which solubility and precipitation occur will vary with the temperature of the solution. By oscillating the pH in the described manner it is believed that the smaller particles formed in the initial precipitation are preferentially dissolved upon lowering the pH and that upon raising the pH the dissolved material is redeposited on the remaining larger particles which survive the drop in pH. The precipitate then can be filtered readily and dried.

This process is considered particularly suitable for use in separating uranium values from solutions obtained by leaching uranium ore. For example, it is common to leach uranium ore with sulfuric acid and/or nitric acid, contact the leach solution with an ion exchange resin to remove the uranium and then to remove the uranium from the resin by an elutriating solution, such as nitric acid, to form a "pregnant eluate." A typical pregnant eluate so formed will contain about 10 grams per liter of uranium, 50 grams per liter of nitrate and 90 grams per liter of sulfate and have a pH of about 1.2.

In producing ammonium diuranate of good filtering and settling characteristics from pregnant eluate, ammonia gas or ammonium hydroxide is added until the pH of the mixture is raised sufficiently to precipitate substantially all the uranium as ammonium diuranate. The pH at which initial precipitation will take place may vary from 5 to 6 according to the temperature of the solution. Substantially complete precipitation, however, occurs at a pH over 6.5. After a large part of the ammonium diuranate is precipitated, the pH is returned to a value somewhat below the initial precipitating pH for a time insufficient to redissolve all the precipitate. The pH may be lowered in several ways, such as with nitric or sulfuric acid. Advisably, however, the pH oscillation is accomplished by addition of some of the acidic pregnant eluate because, in this way, the total consumption or reagent is maintained the same in the oscillatory process as in the conventional, prior art method. The pH oscillation may be repeated as many times as desired by alternately introducing aliquots of pregnant eluate and ammonia.

The concentration of uranium in the solution treated with ammonia or ammonium hydroxide is not critical since the concentration has little effect on the precipitation of ammonium diuranate. Diuranate precipitation is controlled primarily by pH rather than the concentration of the precipitating ions.

For best results, it is advisable that the oscillating pH process of this invention be practiced at an elevated temperature, such as a temperature above 40° C., and advisably over 50° C.

The following examples are presented to illustrate the invention and compare it specifically with the former process.

EXAMPLE 1

Prior art process

Approximately 1 liter of pregnant eluate having a pH of 1.2 and containing 10 grams per liter of uranium, 50 grams per liter of nitrate and 90 grams per liter of sulfate was heated to 75° C. Two-normal ammonium hydroxide was introduced over a 10 minute period with agitation to attain a final pH of 7.1. The resulting slurry was poured into a separatory funnel and allowed to settle. After settling for 2 hours the sludge occupied 9.5 percent of the initial volume of the slurry. The filtering characteristics of this sludge through a Büchner funnel were very poor; it plugged the paper and filtered slowly.

EXAMPLE 2

Oscillating pH process

Approximately 1 liter of the same pregnant eluate used in Example 1 was heated to 60° C. Two-normal ammonium hydroxide and further aliquots of pregnant eluate were then added over a 20 minute period to oscillate the pH four times between the approximate limits of pH 4.5 and 6.5. The solution was agitated during this period. The resulting slurry was poured into a separatory funnel and allowed to settle. After settling for 10 minutes, the sludge occupied three percent of the initial volume of the slurry. The filtering characteristics of the sludge were excellent.

The settling rate and the density of the settled sludge are good indices of filterability. The examples above show that a precipitation conducted by the oscillating pH process, even though carried out at a lower temperature, yields a settled sludge more than three times as dense, in a settling time one-tenth as long, as that obtained by the conventional method, all other variables being substantially equal.

Various changes and modifications of the invention can be made and, to the extent that such variations incorporate the spirit of this invention, they are intended to be included within the scope of the appended claims.

What is claimed is:

1. The process which comprises preparing an aqueous solution of a uranium salt of a mineral acid at an acidic pH at which the uranium salt is soluble, introducing ammonium hydroxide in the mixture to a pH above 5 at which appreciable ammonium diuranate precipitates, adding a mineral acid to the mixture until an acidic pH less than 5 is reached to partially redissolve the ammonium diuranate precipitate, then introducing ammonium hydroxide to a pH above 5 before the precipitate completely redissolves, and separating the dense ammonium diuranate precipitate so formed from the aqueous medium.

2. The process of claim 1 in which the mineral acid is sulfuric acid.

3. The process of claim 1 in which the mineral acid is nitric acid.

4. The process which comprises treating a quantity of acidic pregnant eluate containing the uranium values recovering from uranium ore with ammonium hydroxide to a pH above about 6 to form a mixture containing precipitated ammonium diuranate, adding pregnant eluate to the mixture in an amount sufficient to lower the pH below about 4.5 and partially redissolve the ammonium diuranate precipitate, then introducing ammonium hydroxide to a pH above 6 before the precipitate completely redissolves, and separating the dense ammonium diuranate precipitate so formed from the aqueous medium.

5. The process which comprises preparing a dispersion of solid ammonium diuranate in water at a pH above 5, adding acid to the mixture until an acidic pH less than 5 is reached to partially dissolve the dispersed solid ammonium diuranate, then introducing a base to a pH above 5 before the dispersed solid ammonium diuranate completely dissolves, and separating the dense ammonium diuranate precipitate so formed from the aqueous medium.

6. The process which comprises preparing an aqueous solution of a uranium salt of a mineral acid at a pH below 5, introducing ammonia in the mixture to a pH above 5 at which appreciable ammonium diuranate precipitates, adding a mineral acid to the mixture until an acidic pH less than 5 is reached to partially redissolve the ammonium diuranate precipitate, then introducing ammonia to a pH above 5 before the precipitate completely redissolves, and separating the dense ammonium diuranate precipitate so formed from the aqueous medium.

7. The process which comprises preparing a dispersion of solid ammonium diuranate in water at a pH above 6, adding acid to the mixture until an acidic pH less than 4.5 is reached to partially dissolve the dispersed solid ammonium diuranate, then introducing a base to a pH above 6 before the dispersed solid ammonium diuranate completely dissolves, and separating the dense ammonium diuranate precipitate so formed from the aqueous medium.

8. The process of claim 7 in which the acid is a mineral acid and the base is a member of the group consisting of ammonia and ammonium hydroxide.

9. The process which comprises treating a quantity of acidic pregnant eluate containing the uranium values recovered from uranium ore with ammonia to a pH above about 6 to form a mixture containing precipitated ammonium diuranate, adding pregnant eluate to the mixture in an amount sufficient to lower the pH below about 4.5 and partially redissolve the ammonium diuranate precipitate, then introducing ammonia to a pH above 6 before the precipitate completely redissolves, and separating the dense ammonium diuranate precipitate so formed from the aqueous medium.

10. The process which comprises treating a quantity of acidic pregnant eluate containing the uranium values recovered from uranium ore with ammonia to a pH above 5 to form a mixture containing precipitated ammonium diuranate, adding pregnant eluate to the mixture in an amount sufficient to lower the pH below 5 and partially redissolve the ammonium diuranate precipitate, then introducing ammonia to a pH above 5 before the precipitate completely redissolves, and separating the dense ammonium diuranate preciptiates so formed from the aqueous medium.

References Cited in the file of this patent

UNITED STATES PATENTS

| 2,466,118 | Miller | Apr. 5, 1949 |
| 2,750,253 | Smith | June 12, 1956 |
| 2,790,701 | Kamen | Apr. 30, 1957 |

UNITED STATES PATENT OFFICE
CERTIFICATE OF CORRECTION

Patent No. 3,000,698                          September 19, 1961

Gordon A. Crowe

It is hereby certified that error appears in the above numbered patent requiring correction and that the said Letters Patent should read as corrected below.

Column 3, line 34, for "recovering" read -- recovered --.

Signed and sealed this 30th day of January 1962.

Attest:

ERNEST W. SWIDER
Attesting Officer

DAVID L. LADD
Commissioner of Patents